(12) United States Patent
Mastain

(10) Patent No.: US 10,102,870 B2
(45) Date of Patent: Oct. 16, 2018

(54) SHIELDING AND ELECTRICAL CONTACT DESIGN FOR DEVICES WITH TWO OR MORE READ ELEMENTS

(71) Applicant: Seagate Technology LLC, Cupertino, CA (US)

(72) Inventor: Steven A. Mastain, Spring Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/383,351

(22) Filed: Dec. 19, 2016

(65) Prior Publication Data

US 2017/0098459 A1    Apr. 6, 2017

Related U.S. Application Data

(62) Division of application No. 14/105,434, filed on Dec. 13, 2013, now Pat. No. 9,524,737.

(51) Int. Cl.
| | |
|---|---|
| *G11B 5/115* | (2006.01) |
| *G11B 5/39* | (2006.01) |
| *G11B 5/11* | (2006.01) |
| *G11B 5/48* | (2006.01) |

(52) U.S. Cl.
CPC ............... *G11B 5/112* (2013.01); *G11B 5/11* (2013.01); *G11B 5/115* (2013.01); *G11B 5/397* (2013.01); *G11B 5/398* (2013.01); *G11B 5/3912* (2013.01); *G11B 5/3958* (2013.01); *G11B 5/4886* (2013.01); *Y10T 29/49032* (2015.01)

(58) Field of Classification Search
None
See application file for complete search history.

(56) References Cited

U.S. PATENT DOCUMENTS

| | | |
|---|---|---|
| 6,185,079 B1 | 2/2001 | Gill |
| 6,680,827 B2 | 1/2004 | Li et al. |
| 6,819,530 B2 | 11/2004 | Gill |
| 7,911,743 B2 | 3/2011 | Hachisuka et al. |
| 7,924,533 B2 | 4/2011 | Maejima et al. |
| 8,004,799 B2 | 8/2011 | Biskeborn et al. |
| 8,243,398 B2 | 8/2012 | Partee et al. |
| 8,824,106 B1 | 9/2014 | Garfunkel et al. |
| 8,891,207 B1 | 11/2014 | Li et al. |
| 2002/0181168 A1* | 12/2002 | Gill et al. ............ G11B 5/3909 360/324.2 |
| 2004/0021982 A1* | 2/2004 | Ozue et al. .......... G11B 5/3951 360/123.12 |
| 2013/0250447 A1 | 9/2013 | Erden |
| 2015/0062735 A1 | 3/2015 | Sapozhnikov et al. |

* cited by examiner

*Primary Examiner* — Craig A. Renner
(74) *Attorney, Agent, or Firm* — Mueting, Raasch & Gebhardt, P.A.

(57) ABSTRACT

A magnetic read head including a first read element magnetically coupled to a bottom shield; a second read element magnetically coupled to a top shield; a magnetic shielding structure that magnetically shields the first read element from the second read element; and a first electrical contact electrically coupled to the bottom shield, a second electrical contact electrically coupled to the top shield and a third electrical contact electrically coupled to the magnetic shielding structure.

9 Claims, 9 Drawing Sheets

SHIELDING AND ELECTRICAL CONTACT DESIGN FOR DEVICES WITH TWO OR MORE READ ELEMENTS

This is a divisional application of U.S. patent application Ser. No. 14/105,434, filed Dec. 13, 2013, and set to issue as U.S. Pat. No. 9,524,737 on Dec. 20, 2016, the disclosure of which is incorporated herein by reference thereto.

SUMMARY

A magnetic read head including a first read element magnetically coupled to a bottom shield; a second read element magnetically coupled to a top shield; a magnetic shielding structure that magnetically shields the first read element from the second read element; and a first electrical contact electrically coupled to the bottom shield, a second electrical contact electrically coupled to the top shield and a third electrical contact electrically coupled to the magnetic shielding structure.

A two dimensional magnetic recording system that includes a read head with a first reader coupled to a first shield, a second reader coupled to a second shield, a third shield that magnetically shields the first reader from the second reader, a first electrical contact electrically coupled to the first shield, a second electrical contact electrically coupled to the second shield and a third electrical contact electrically coupled to the third shield through an isolation layer; and a controller and power source coupled to the first, second and third electrical contacts to operate the magnetic read head.

Also disclosed are methods that include forming a first read element, the first read element having a first surface which is magnetically coupled to a bottom shield, a second surface which is opposite the first surface, and a first side surface between the first and second surfaces; electrically isolating the first side surface of the first read element; forming a shielding structure on at least the second surface of the first read element; forming a second read element, the second read element having a first surface which is electrically coupled to a portion of the shielding structure, a second surface which is opposite the first surface, and a first side surface between the first and second surfaces; electrically isolating the entire second read element except the second surface; and forming a top shield, the top shield being magnetically coupled to the second surface of the second read element.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
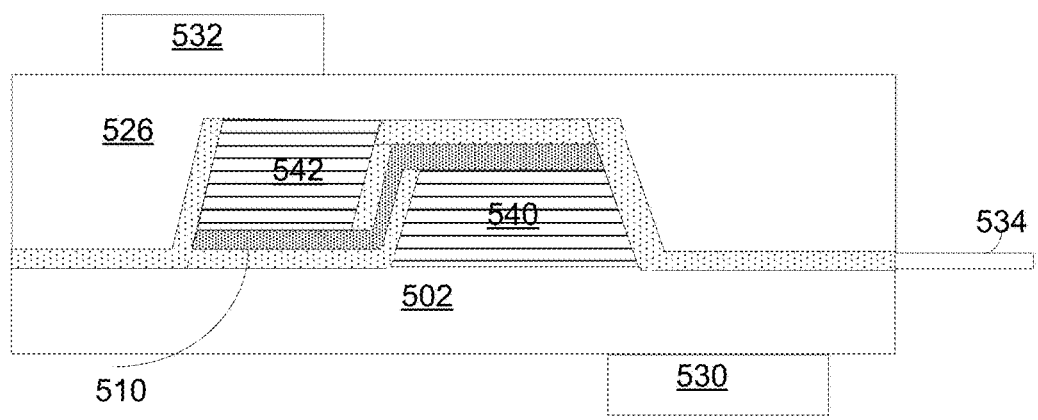
FIG. 1 depicts a two element read head according to some embodiments.

Disclosed herein are methods of forming devices. Devices formed using such methods can be utilized for reading data on magnetic recording media. Methods disclosed herein can form devices that include two read elements or devices that include more than two read elements (e.g., a plurality of read elements). Devices that employ and/or enable two dimensional magnetic recording (TDMR) utilize two or more read elements. Disclosed devices include (at least) two read elements and three electrical contacts thereto. An exemplary embodiment of a disclosed device is depicted in FIG. 1 herein. The device in FIG. 1 includes a first read element 540, which can be magnetically coupled to a bottom shield 502 and a second read element 542, which can be magnetically coupled to a top shield 526. The device also includes a magnetic shielding structure 510 that can magnetically shield the first read element from the second read element. Also included is a first electrical contact 530 electrically coupled to the bottom shield 502, a second electrical contact 532 electrically coupled to the top shield 526 and a third electrical contact 534 electrically coupled to the magnetic shielding structure 510.

In some embodiments, exemplary methods of forming a device that includes two read elements can generally include forming a first reader stack, electrically isolating an interior surface of the first reader stack, forming a magnetic shielding structure on at least a top surface of the first reader stack, forming a second reader stack wherein the bottom of the second reader stack is electrically coupled to the magnetic shielding structure, electrically isolating all surfaces of the second reader stack except the top surface, and forming a top shield which is magnetically coupled to the non-electrically isolated surface of the second stack.

Disclosed methods can utilize various processes to carry out the desired effect. Exemplary methods of forming layers of materials can include, for example physical vapor deposition (PVD), chemical vapor deposition (CVD), plasma enhanced chemical vapor deposition (PECVD), atomic layer deposition (ALD), and plasma enhanced atomic layer deposition (PEALD). Exemplary methods of removing at least a portion of a layer can include chemical mechanical polishing (CMP), etching (for example reactive ion etching (RIE) or wet or dry chemical etching)), milling and photolithographic methods.

Figure 2A:
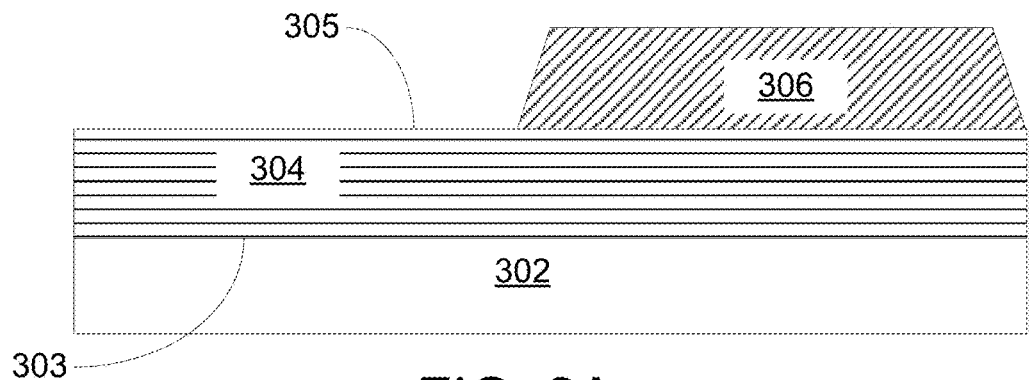
FIGS. 2A to 2J depict cross sections of devices (including two read elements) at various stages of formation according to exemplary methods of formation.

FIGS. 2A through 2J exemplify a device being formed according to exemplary disclosed methods. FIG. 2A shows an exemplary article that can include a bottom shield 302. The bottom shield 302 can be formed on a substrate (not pictured). The bottom shield 302 can also be referred to as a first shield. The substrate can also include other layers, structures or devices. In some exemplary embodiments, an article can include a seed layer between the substrate and the bottom shield 302. The bottom shield 302 can be formed of a material that can function to magnetically shield a magnetic device from stray magnetic fields. In some embodiments, exemplary materials for the bottom shield 302 can include, for example alloys of iron (Fe), nickel (Ni), cobalt (Co), copper (Cu), or combinations thereof. It should be noted that "top" and "bottom" (or other terms like "upper" and "lower") when utilized throughout the specification, are utilized strictly for relative descriptions and do not necessarily imply any overall orientation of the article in which the described element is located.

On a top surface of the bottom shield 302 is disposed a first reader stack 304. The first reader stack 304 can contain multiple layers of materials and can ultimately be utilized as or formed into a first reader element in disclosed devices. It should be noted that a read element can be formed from or can be considered a reader stack or read stack that has been processed or modified in one or more ways. In some embodiments, a first reader stack 304 can include a first surface 303 that is magnetically coupled to the bottom shield 302. The first reader stack 304 can also include a second surface 305 that is opposite the first surface 303. The first reader stack 304 can include layers that can function as magnetoresistive, giant magnetoresistive (GMR), tunneling magnetoresistive (TMR) or other types of sensors, which can read data on a magnetic media.

The article depicted in FIG. 2A includes a first patterned photoresist region 306. The first patterned photoresist region 306 can be made of and be formed using processes such as those generally known. The first patterned photoresist region 306 is disposed over only part of the second surface 305 of the first reader stack 304. The first patterned photoresist region 306 can be utilized to protect a portion of the first reader stack 304 while a second portion of the first reader stack 304 is being removed. The portion of the stack being removed can be removed by milling, for example. This step forms an interior side surface 307 of the first reader stack 304. The interior side surface 307 of the first reader stack can also be referred to as first side surface. The interior side surface 307 of the first reader stack 304 is between, and connects the first surface 303 and the second surface 305.

Formation and use of the first patterned photoresist region 306 is an exemplary process that can be used as part of the process to form a first read element from a first read stack. The formed first read element (or the first read stack) has a first surface that is magnetically coupled to a bottom shield, a second surface which is opposite the first surface, and an interior side surface between the first and second surfaces. The first read element can be described as being magnetically coupled, magnetically connected, electrically coupled, electrically connected, or some combination thereof. In some embodiments, the first read element can be described as being magnetically coupled and electrically coupled to the bottom shield.

Figure 2B:
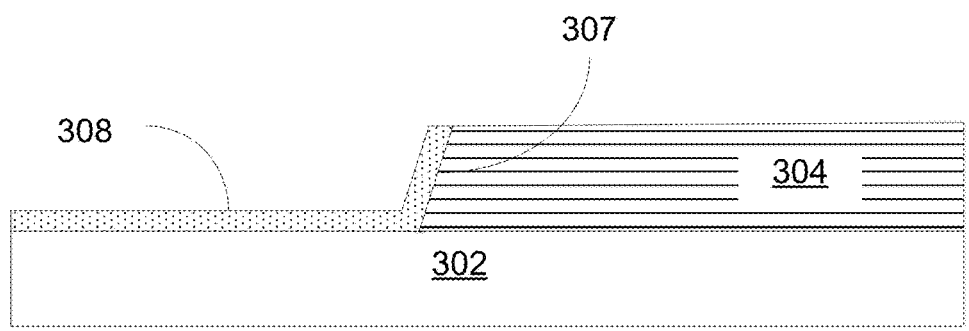

A next step in an exemplary method can include a step of electrically isolating the interior surface of the first reader stack. The article in FIG. 2B is shown after completion of this step. The article includes the bottom shield 302, the first reader stack 304 with the interior surface 307 and a first electrical isolation region 308. The first electrical isolation region 308 can be adjacent to, on, or in electrical contact with the interior surface 307 of the first reader stack 304, a portion of the bottom shield 302, or both. In some embodiments, the first electrical isolation region 308 can be adjacent to, on, or in electrical contact with both the interior surface 307 of the first reader stack 304 and a portion of the bottom shield 302.

The first electrical isolation region 308 can be made of an electrically insulating material. In some embodiments, the first electrical isolation region 308 can include materials such as, for example alumina ($Al_2O_3$), silicon dioxide ($SiO_2$), and magnesium oxide (MgO). In some embodiments, the first electrical isolation region 308 can have a thickness that is at least 2 nm. In some embodiments, the first electrical isolation region 308 can have a thickness that is at least 2.5 nm. In some embodiments, the first electrical isolation region 308 can have a thickness that is not greater than 5 nm. In some embodiments, the first electrical isolation region 308 can have a thickness that is not greater than 4 nm. In some embodiments, the first electrical isolation region 308 can have a thickness that is 3 nm. The desired thickness of the first electrical isolation region 308 (as well as any deposited layers) can be obtained by depositing an excess thickness of material and processing some of the material away to obtain a desired thickness.

Once a portion of the first reader stack 304 has been removed and the first electrical isolation region 308 has been formed, the first patterned photoresist region 306 can be removed. The article in FIG. 2B is pictured after the first patterned photoresist region 306 has been removed. Formation of the first electrical isolation region 308 is an exemplary process for electrically isolating the interior surface of the first reader stack.

Figure 2C:
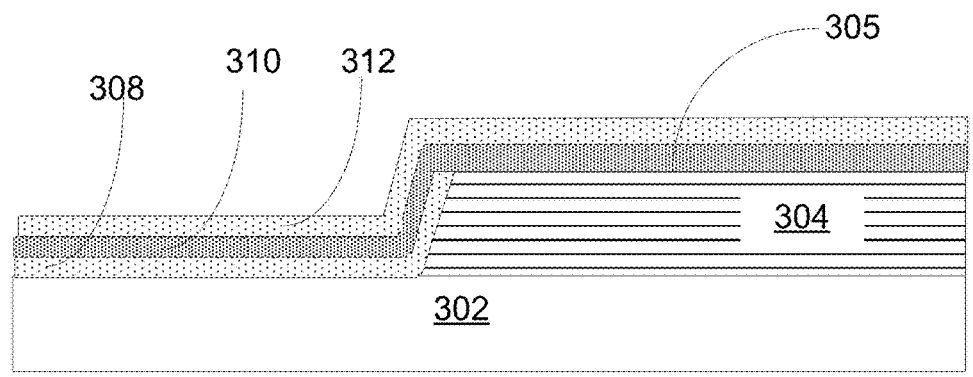

A next step in an exemplary method can include a step of forming a magnetic shielding layer. The article in FIG. 2C shows an article with a magnetic shielding layer 310. A magnetic shielding layer can also be referred to as, or can be utilized as, or formed into a magnetic shielding structure or simply a shielding structure. A magnetic shielding structure can also be referred to as a third shield (in instances where the bottom shield is referred to as a first shield and the top shield is being referred to as a second shield). A magnetic shielding layer or magnetic shielding structure can function to conduct electricity and magnetically shield. As seen in FIG. 2C, the magnetic shielding layer 310 is disposed on, adjacent to, or is electrically coupled to at least the second surface of the first reader stack 304. The magnetic shielding layer 310 can be disposed on, adjacent to or be magnetically coupled to the second surface of the first reader stack 304, a surface of the first electrical isolation region 308, or both. In some embodiments, magnetic shielding layer 310 can be disposed on, adjacent to or be magnetically coupled to the second surface of the first reader stack 304, the surface of the first electrical isolation region 308 adjacent the interior surface 307 of the first reader stack 304, and the surface of the first electrical isolation region 308 adjacent the bottom shield 302. This embodiment can also be described as having the magnetic shielding layer 310 disposed over (but not in contact with the portion of the bottom shield not covered by the first reader stack 304. Formation of the magnetic shielding layer 310 an exemplary process for forming a magnetic shielding structure on at least the second surface of the first reader stack.

The magnetic shielding layer can generally be made of any material that can conduct or transmit a magnetic field there through. In some embodiments, a magnetic shielding layer can generally be made of any material that can conduct or transmit a magnetic field there through and conduct electricity there through. In some embodiments, the material of the magnetic shielding layer can include an alloy that includes nickel (Ni), iron (Fe), cobalt (Co), copper (Cu), or combinations thereof. In some embodiments, the magnetic shielding layer can have a thickness from as little as 15 nanometers (nm) for example. In some embodiments, the magnetic shielding layer can have a thickness from as little as 17 nm. In some embodiments, the magnetic shielding layer can have a thickness of not greater than 22 nm. In some embodiments, the magnetic shielding layer can have a thickness of not greater than 20 nm. In some embodiments, the magnetic shielding layer can have a thickness of 19 nm.

The article in FIG. 2C also includes a second electrical isolation region 312. The second electrical isolation region 312 can be formed over or disposed on at least a portion of the magnetic shielding layer 310. In some embodiments, the second electrical isolation region 312 can be formed over or disposed on at least the portion of the magnetic shielding layer 310 that is in contact with the first reader stack 304 and the first electrical isolation region 308. In some embodiments, the second electrical isolation region 312 can have a thickness that is at least 2 nm. In some embodiments, the second electrical isolation region 312 can have a thickness that is at least 2.5 nm. In some embodiments, the second electrical isolation region 312 can have a thickness that is not greater than 5 nm. In some embodiments, the second electrical isolation region 312 can have a thickness that is not greater than 4 nm. In some embodiments, the second electrical isolation region 312 can have a thickness that is 3 nm.

Figure 2D:
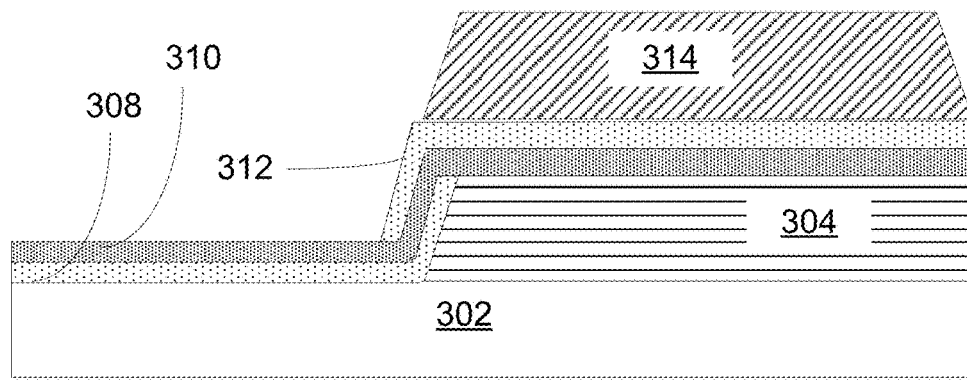

The article in FIG. 2D shows a second patterned photoresist region 314 that can be utilized to remove a portion of the second electrical isolation region 312. A portion of the magnetic shielding layer 310 that is not over the first reader stack 304 or adjacent the interior side surface 307 of the first reader stack 304 is left uncovered by the second electrical isolation region 312 after removal of a portion of the second electrical isolation region 312 by, for example etching. Once the second isolation region 312 has been modified, the second patterned photoresist region 314 can be removed.

Figure 2E:
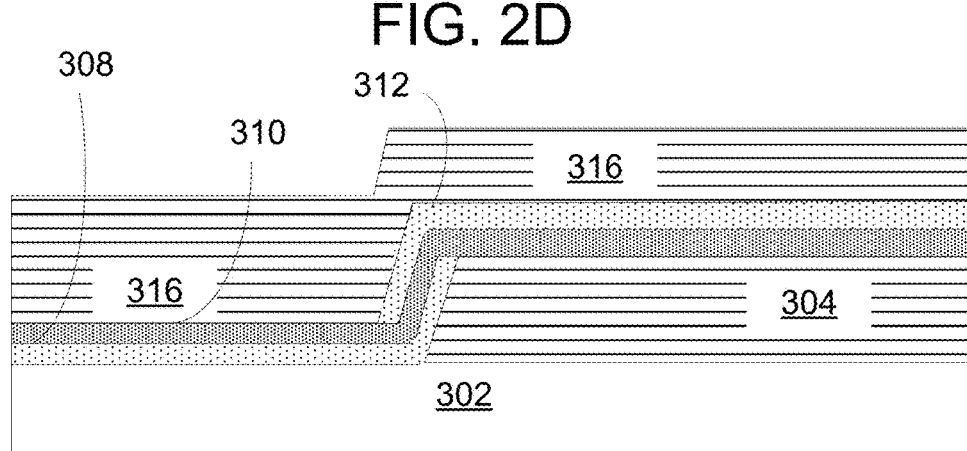

The article in FIG. 2E includes a second reader stack 316. The second reader stack 316 is deposited in such a way that the second reader stack 316 is electrically coupled to the magnetic shielding layer 310. In some embodiments, this can be accomplished by having the second reader stack 316 in contact with the magnetic shielding layer 310. In some embodiments, this can be accomplished by having the second reader stack 316 in contact with at least the surface of the magnetic shielding layer 310 that is positioned over the bottom shield 302 but not over any portion of the first reader stack 304. In some embodiments, this can be accomplished by having the second reader stack 316 in contact with only the surface of the magnetic shielding layer 310 that is positioned over the bottom shield 302 but not over any portion of the first reader stack 304.

The second stack 316 can be deposited over the entire surface of the existing structure, as such the second stack 316 can be adjacent to, disposed on, or in contact with the surface of the magnetic shielding layer 310 positioned over the bottom shield 302, the surface of the second electrical isolation region 312 positioned over the interior surface 307 of the first reader stack 304, the surface of the second electrical isolation region 312 positioned over the second surface 305 of the first reader stack 304, or some combination thereof. In some embodiments, the second stack 316 can be adjacent to, disposed on, or in contact with only the surface of the magnetic shielding layer 310 positioned over the bottom shield 302 and the surface of the second electrical isolation region 312 positioned over the interior surface 307 of the first reader stack 304. In some embodiments, the second stack 316 can be adjacent to, disposed on, or in contact with the surface of the magnetic shielding layer 310 positioned over the bottom shield 302, the surface of the second electrical isolation region 312 positioned over the interior surface 307 of the first reader stack 304, and the surface of the second electrical isolation region 312 positioned over the second surface 305 of the first reader stack 304. In such embodiments, a portion of the second stack 316 positioned adjacent to, disposed on, or in contact with the surface of the second electrical isolation region 312 positioned over the second surface 305 of the first reader stack 304 can be removed after formation, for example via CMP. Such a removal step leaves a second stack 316 that is positioned adjacent to, disposed on, or in contact with only the surface of the magnetic shielding layer 310 positioned over the bottom shield 302 and the surface of the second electrical isolation region 312 positioned over the interior surface 307 of the first reader stack 304.

Figure 2F:
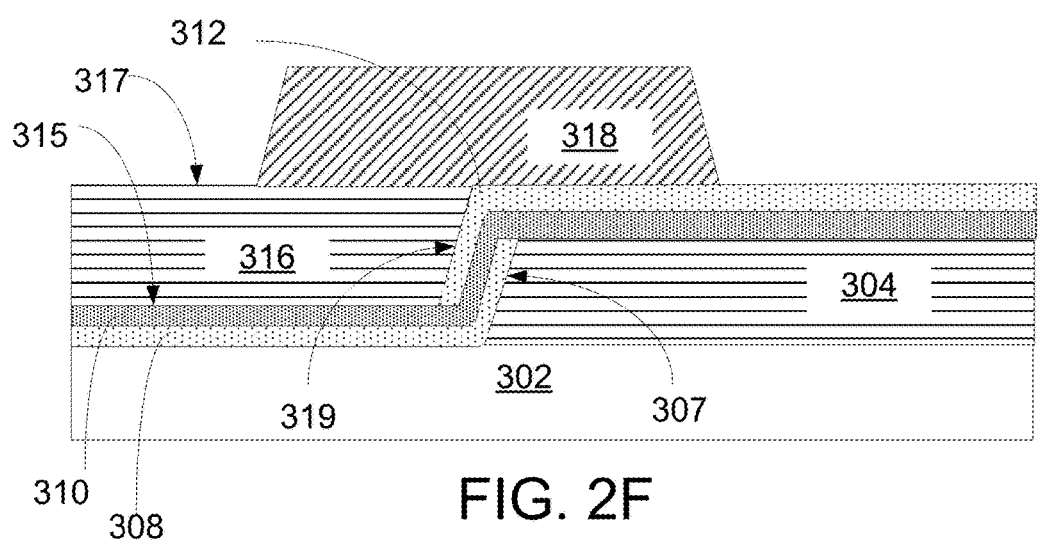

FIG. 2F shows a second reader stack 316 being either deposited only over the bottom shield 302 but not over any portion of the first reader stack 304 or having been deposited in more locations, but processed to ultimately exist only over the bottom shield 302 but not over any portion of the first reader stack 304. Such a reader stack 316 can be described as including a first surface 315 that is electrically coupled to the magnetic shielding layer 310 and a second surface 317 that is opposite the first surface 315. The second reader stack 316 also includes an interior surface 319 between the first surface 315 and the second surface 317.

It can be seen from FIG. 2F that the interior surface 319 of the second reader stack 316 and the interior surface 307 of the first reader stack 304 are complementary and separated by the second electrical isolation region 312, the magnetic shielding layer 310 and the first electrical isolation region 308. As such, the distance between the first reader stack 304 and the second reader stack 316 can be described as being dictated at least in part by the thicknesses of those three structures. Formation of the second reader stack 316 is an exemplary process for forming a second read element, the second read element having a first surface which is electrically coupled to a portion of the magnetic shielding structure, a second surface which is opposite the first surface, and an interior side surface between the first and second surfaces.

FIG. 2F also shows a third patterned photoresist region 318. The third patterned photoresist region 318 is configured to protect regions of the first reader stack 304 and the second reader stack 316 respectively adjacent or closest to their interior surfaces 307 and 319, the magnetic shielding layer 310 on the second surface of the first reader stack 304, and the second electrical isolation region on the magnetic shielding layer 310 over the second surface of the first reader stack 304. The unprotected regions of the structure can be removed, for example via milling leaving material only under the third patterned photoresist region 318.

Figure 2G:
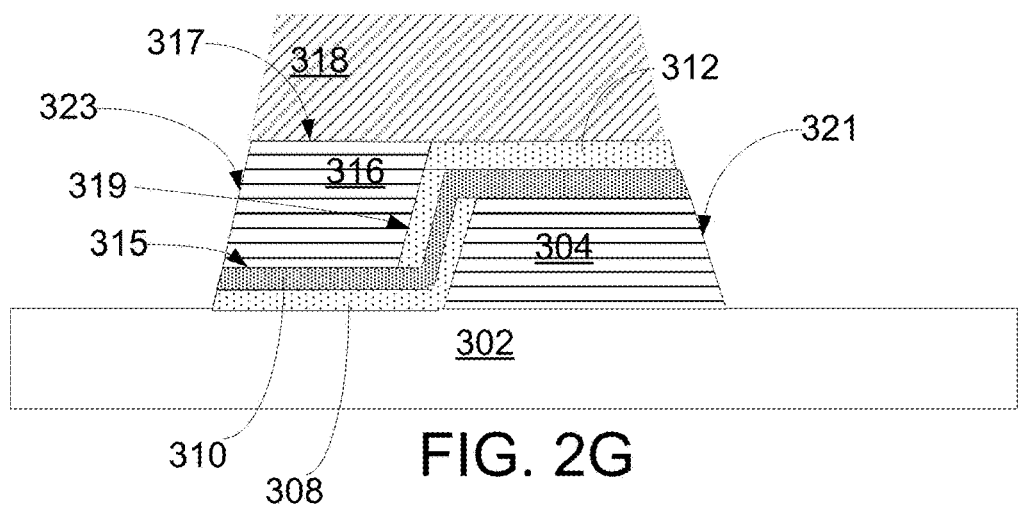
Figure 2H:
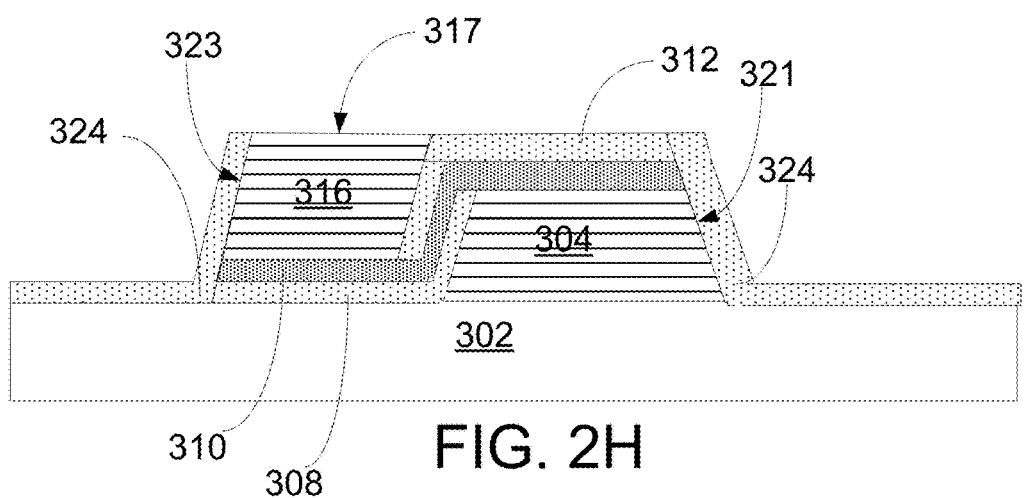

FIG. 2G shows the structure, with the third patterned photoresist region 318 to show the protected region of the structure after milling away (for example) the unprotected regions of the structure. Removal of the unprotected regions of the structure forms an exterior surface 321 of the first reader stack 304 and an exterior surface 323 of the second reader stack 316. The third patterned photoresist region 318 is also utilized in the next step.

A next step in an exemplary method can include formation of a third electrical isolation region 324. The third electrical isolation region 324 functions in combination with the remainder of the article to electrically isolate the entire article except the second surface 317 of the second reader stack 316 and the opposite first surface 315. The third electrical isolation region 324 on its own functions to electrically isolate the entire second reader stack 316 except the first surface 315 and second surface 317 thereof.

The third patterned photoresist region 318 can function as a mask so that the material of the third electrical isolation region 324 is not deposited on the second surface 317 of the second reader stack 316. The third patterned photoresist region 318 can also function to ensure that the material of the second electrical isolation region 312 above the second surface 305 of the first reader stack 304 does not become thicker than desired. It should be noted that the third electrical isolation region 324 can be deposited in one or more than one steps. As such, a region that was deposited in more than one step may still be referred to herein as a single third electrical isolation region 324. In some embodiments, the third electrical isolation region 324 can generally cover at least a portion of the exposed bottom shield 302 adjacent the first reader stack 304, the exterior surface 321 of the first read element 304, the exterior surface 323 of the second reader stack 316, and the exposed bottom shield 302 adjacent the second read element 316. It can be seen from FIG. 2H that the third electrical isolation region 324 in combination with the portion of the second electrical isolation region 312 positioned over the first read element 304 can function to electrically isolate the entire device except the second surface 319 of the second read element 316 and the first surface. Formation of the third electrical isolation region 324 is an exemplary process for electrically isolating the entire second reader stack except the second surface.

The third electrical isolation region 324 can be made of an electrically insulating material. In some embodiments, the third electrical isolation region 324 can include materials such as, for example alumina ($Al_2O_3$), silicon dioxide ($SiO_2$), and magnesium oxide (MgO). The third electrical isolation layer can generally be made of the same material as the other two isolation layers 308 and 312. In some embodiments, the third electrical isolation region 324 can have a thickness that is at least 2 nm. In some embodiments, the third electrical isolation region 324 can have a thickness that is at least 2.5 nm. In some embodiments, the third electrical isolation region 324 can have a thickness that is not greater than 5 nm. In some embodiments, the third electrical isolation region 324 can have a thickness that is not greater than 4 nm. In some embodiments, the third electrical isolation region 324 can have a thickness that is 3 nm.

After formation of the third electrical isolation region 324, the third patterned photoresist region 318 can be removed.

Figure 2I:
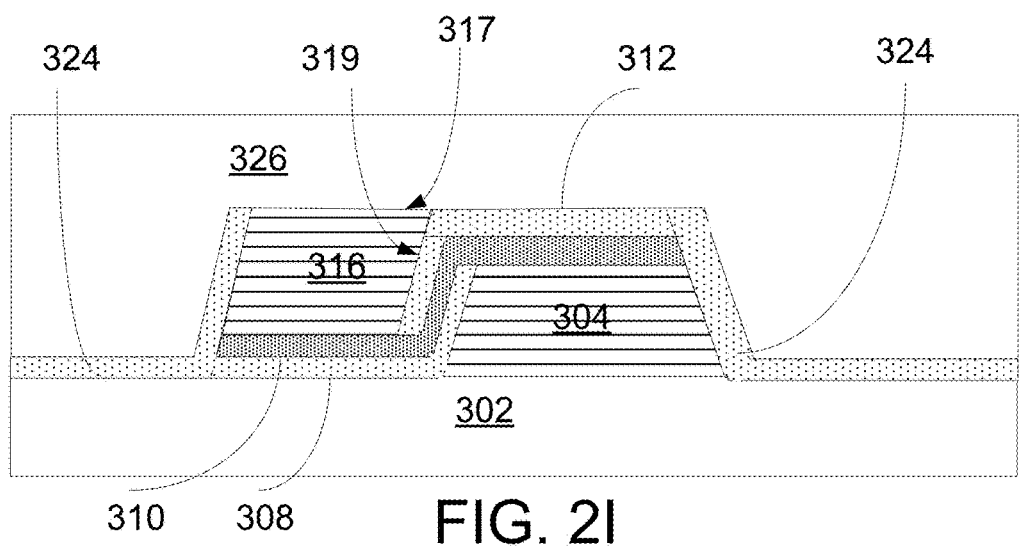

A next step in an exemplary method includes formation of a top shield. It should also be noted that the top shield can be referred to as second shield (in instances where the bottom shield is being referred to as a first shield). FIG. 2I shows the article after completion of this step, with the top and side shield 326 being depicted therein. The top and side shield 326 is in magnetic connection with or is magnetically coupled to the second surface 317 of the second reader stack 316. The top and side shield 326 can be formed of a material that can function to magnetically shield a magnetic device from stray magnetic fields. In some embodiments, exemplary materials for the top and side shield 326 can include, for example alloys of iron (Fe), nickel (Ni), cobalt (Co), copper (Cu), or combinations thereof. In some embodiments, the top shield material (as well as the bottom shield material discussed above) can be electroplated, for example. Deposition and optional further processing of the top shield material can be preceded by deposition of a seed layer, for example. Optional further processing that could take place on deposited top shield material can include, for example planarization. Formation of the top and side shield 326 is an exemplary process for forming a top and side shield, the top and side shield being magnetically coupled to the second surface of the second reader element.

It should be noted that the steps and articles depicted in FIGS. 2A through 2I do not necessarily include all of the steps depicted or all of the interim articles produced in various embodiments of disclosed methods.

Figure 2J:
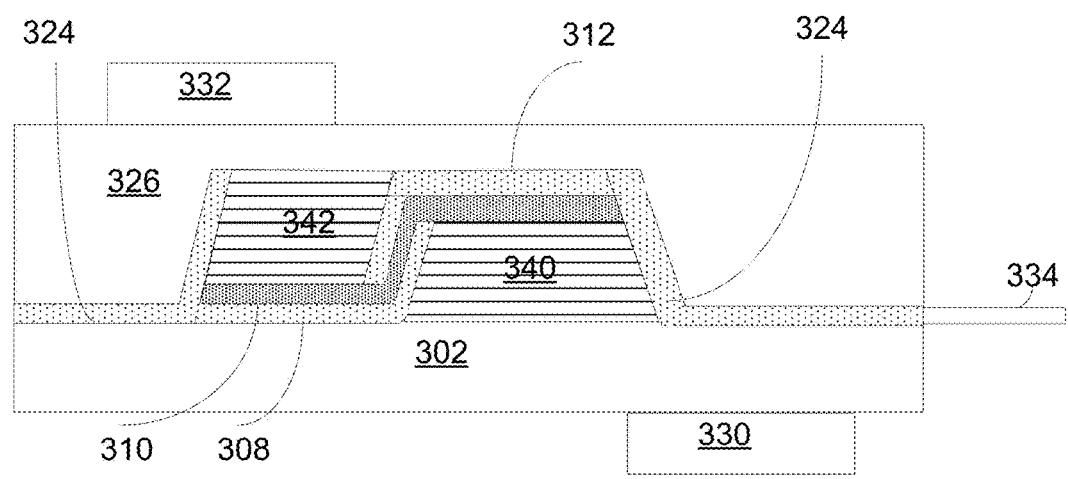

For example, FIG. 2J shows the article after an additional step, formation of electrical contacts. In the embodiment depicted in FIG. 2J, a first electrical contact 330 can be formed to be electrically coupled to the bottom shield 302, a second electrical contact 332 can be formed to be electrically coupled to the top and/or side shield 326 and a third electrical contact 334 can be formed to be electrically coupled to the magnetic shielding layer 310. It should be noted that any of the electrical contacts could also be located in another plane not depicted in FIG. 2J. As such, the third electrical contact 334 appears to at least be in physical contact with the third electrical isolation layer 324, but in fact it is electrically coupled to the magnetic shielding layer 310. For example, the third electrical contact 334 could be positioned farther along the plane that goes into the paper. In configurations where there are electrical contacts made to the noted elements, the magnetic shielding layer can function as a common return path for electrical current. In some embodiments, exemplary materials for the electrical contacts 330, 332 and 334 can include, for example copper (Cu), ruthenium (Ru), rhodium (Rh), gold (Au) or other non-magnetic electrically conducting metals and their alloys.

The three electrical contacts can also be connected to various other devices in order to form a system. Such systems could allow the device to be controlled and operated, for example. Exemplary system components can include, for example controllers, power sources, and circuitry to facilitate operation of the devices disclosed.

The device depicted in FIG. 2J is an example of a device that will be discussed below, with a bottom shield 302, a top shield 326 (which can also be referred to as a top and side shield 326), a first read element 340 that is magnetically coupled to the bottom shield, a second read element 342 that is magnetically coupled to the top shield, a magnetic shielding structure 310 that magnetically shields the first read element from the second read element, and three electrical contacts: a first electrical contact 330 can be formed to be electrically coupled to the bottom shield 302, a second electrical contact 332 can be formed to be electrically coupled to the top and side shield 326 and a third electrical contact 334 can be formed to be electrically coupled to the magnetic shielding structure 310.

Also disclosed herein are methods of forming devices that include at least three read elements. In some embodiments, exemplary methods of forming a device that includes three or more read elements can include forming a first reader stack, electrically isolating interior and exterior surfaces of the first reader stack, forming a magnetic shielding structure on at least a top surface of the first reader stack, forming a second reader stack wherein the bottom of the second reader stack is electrically coupled to the magnetic shielding structure, electrically isolating all surfaces of the second reader stack except the top surface, and forming a top and side shield structure which is magnetically coupled to the non-electrically isolated surface of the second stack.

Disclosed methods of forming an article including at least three read elements can be characterized as being similar to that discussed above for forming an article including two read elements. A distinction between the two sets of methods is that the first reader stack in methods that are designed to fabricate three or more readers utilize the first reader stack as the middle or interior read element in a device. Stated another way, a distinction between the two sets of methods is that the first reader stack in methods that are designed to fabricate three or more readers form two side surfaces of the first reader stack initially (instead of only an interior surface) and electrically isolate both of those side surfaces before a second reader stack is formed on both sides of the electrically isolated first read element.

Figure 3A:
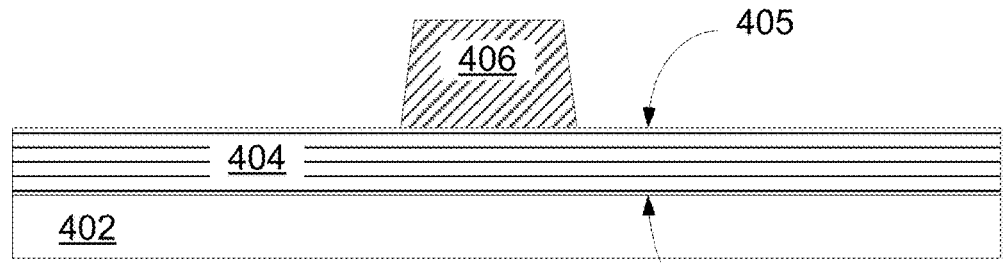
FIGS. 3A to 3I depict cross sections of devices (including three read elements) at various stages of formation according to exemplary methods of formation.
Figure 3B:
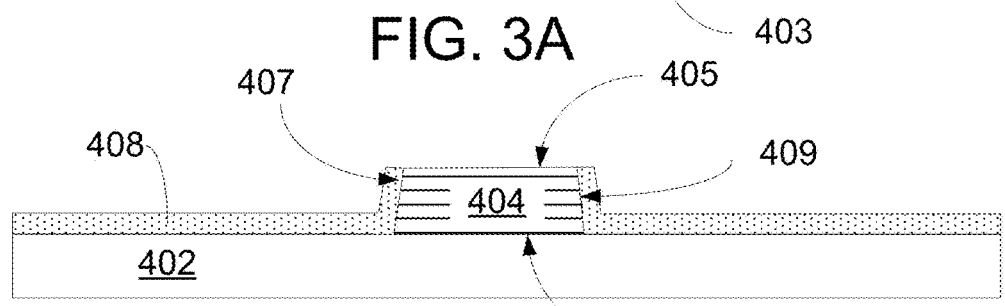

FIGS. 3A through 3I exemplify a device being formed according to exemplary disclosed methods. FIG. 3A shows an exemplary article that can include a bottom shield 402. The bottom shield 402 can be formed on a substrate (not pictured). The substrate can also include other layers, structures or devices. In some exemplary embodiments, an article can include a seed layer between the substrate and the bottom shield 402. The bottom shield 402 can generally be made of materials and have dimensions as discussed above with respect to the bottom shield 302. On a top surface of the bottom shield 402 is disposed a first reader stack 404. The first reader stack 404 can generally be made of materials and have functionality as discussed above with respect to the first reader stack 304.

The article depicted in FIG. 3A also includes a first patterned photoresist region 406. The first patterned photoresist region 406 can be made of and be formed using processes such as those generally known. The first patterned photoresist region 406 can be configured so that the first reader stack 404 once a portion thereof is removed has dimensions that are desired in a final first reader element of a device. The first patterned photoresist region 406 can be utilized to remove (for example via milling) the unprotected portions of the first reader stack 404 resulting in the first reader stack 404 depicted in FIG. 3B. The patterned first reader stack 404 includes the previously defined first surface 403 and the opposed second surface 405 as well as a first side surface 407 and an opposing second side surface 409.

After the first reader stack 404 is patterned, the first patterned photoresist region 406 also functions to define where the first electrical isolation region 408 will be deposited. The first electrical isolation region 408 is adjacent to, disposed on, or in electrical communication with first side surface 407 and the second side surface 409 of the first reader stack 404. The first electrical isolation region 408 is not located on the second surface 405 of the first reader stack 404 because it was covered with the first patterned photoresist region 406 when the material of the first electrical isolation region 408 was deposited.

The first electrical isolation region 408 can generally be made of materials and have dimensions as discussed above with respect to the first electrical isolation region 308. Once the first electrical isolation region 408 has been formed, the first patterned photoresist region 406 can be removed, thereby obtaining the article depicted in FIG. 3B.

Figure 3C:
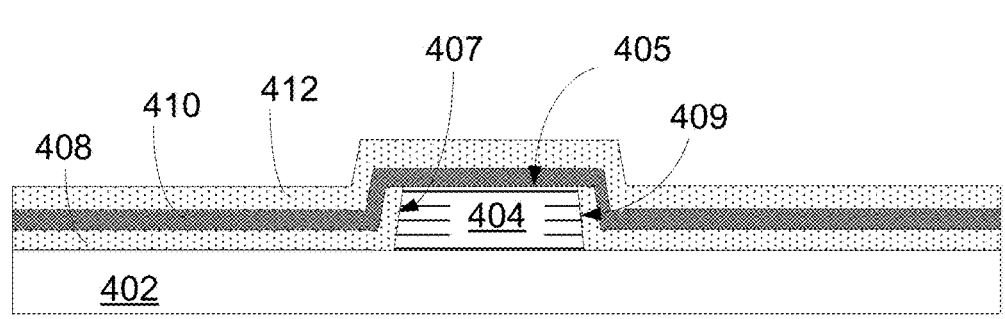

A next step in an exemplary method can include a step of forming a magnetic shielding layer. The article in FIG. 3C shows an article with a magnetic shielding layer 410. A magnetic shielding layer can also be referred to as, or can be utilized as, or formed into a magnetic shielding structure. The magnetic shielding layer 410 can generally be made of materials and have dimensions as discussed above with respect to the magnetic shielding layer 310.

As seen in FIG. 3C, the magnetic shielding layer 410 is disposed on, adjacent to, or is electrically coupled to at least the second surface 405 of the first reader stack 404. The magnetic shielding layer 410 can be disposed on, adjacent to or be electrically coupled to the second surface 405 of the first reader stack 404, a surface of the first electrical isolation region 408, or both. In some embodiments, magnetic shielding layer 410 can be disposed on, adjacent to or be electrically coupled to the second surface 405 of the first reader stack 404, the surface of the first electrical isolation region 408 adjacent the first surface 407 of the first reader stack 404, the surface of the first electrical isolation region 408 adjacent the second surface 409 of the first reader stack 404, and the surfaces of the first electrical isolation region 408 adjacent the bottom shield 402. This embodiment can also be described as having the magnetic shielding layer 410 disposed over, but not in contact with or not in magnetic communication with the portion of the bottom shield 402 not covered by the first reader stack 404. Formation of the magnetic shielding layer 410 is an exemplary process for forming a magnetic shielding structure on at least the second surface of the first reader stack.

The article in FIG. 3C also includes a second electrical isolation region 412. The second electrical isolation region 412 can be formed over or disposed on at least a portion of the magnetic shielding layer 410. In some embodiments, the second electrical isolation region 412 can be formed over or disposed on at least the portion of the magnetic shielding layer 410 that is in contact with the first reader stack 404 and the first electrical isolation region 408. The second isolation region 412 can generally be made of materials and have dimensions as discussed above with respect to the second isolation region 412.

Figure 3D:
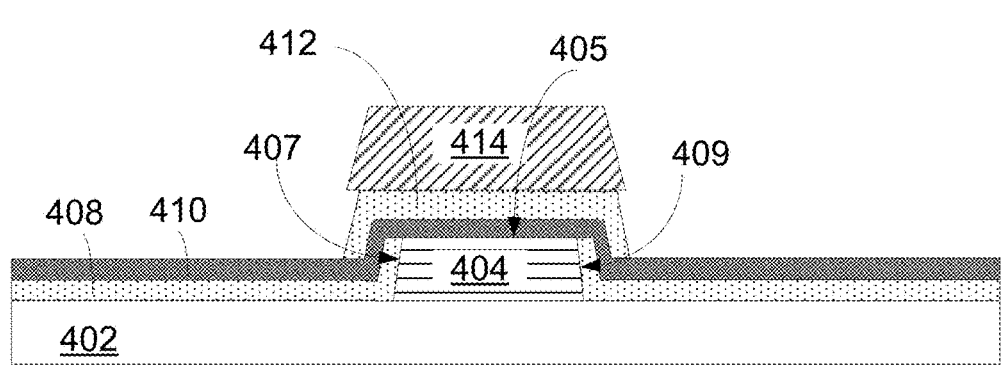
Figure 3E:
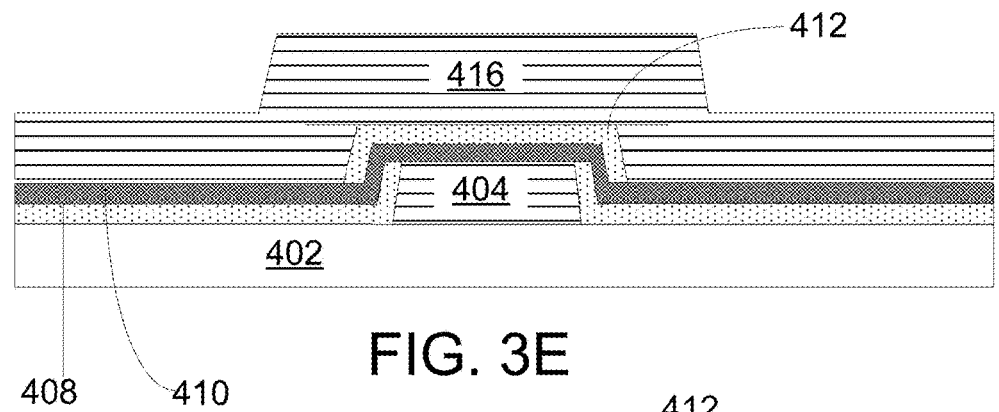

A next step in an exemplary method includes forming a second patterned photoresist region 414, as seen in FIG. 3D. The second patterned photoresist region can be configured so that it is located over and therefore protects the first reader stack 404, and at least a portion of the magnetic shielding layer 410 and the second isolation region 412. After the second patterned photoresist region 414 is formed, it can be used to remove a desired portion of the second electrical isolation region 412. The article in FIG. 3D is pictured after removal of a portion of the second electrical isolation region 412. This removal step can be accomplished using any desired processes or methods, including for example etching.

As seen in FIG. 3D, only the portion of the second electrical isolation region 412 that is located under the second patterned photoresist region 414 remains. The remaining second electrical isolation region 412 is positioned adjacent the magnetic shielding layer 410 adjacent the first side surface 407 and the second side surface 409 of the first reader stack 404 as well as adjacent the magnetic shielding layer 410 adjacent the second surface 405 of the first reader stack. Functionally, this configuration of the second electrical isolation region 412, the magnetic shielding layer 410, the first electrical isolation region 408 and the first reader stack impedes magnetic communication from the first read element 404 to both opposite cross track directions (e.g., away from both the first side surface 407 and the second side surface 409) through the magnetic shielding layer 410. After removal of a portion of the second electrical isolation region 412, the second patterned photoresist region 414 can be removed.

A next step in exemplary methods can include deposition or formation of the second reader stack material. An article after deposition of the second reader stack material can be seen in FIG. 3E. The second reader stack 416 can be deposited in such a way that the second reader stack 416 is electrically coupled to the magnetic shielding layer 410. In some embodiments, this can be accomplished by having the second reader stack 416 in contact with the magnetic shielding layer 410. In some embodiments, this can be accomplished by having the second reader stack 416 in physical contact with at least the surface of the magnetic shielding layer 410 that is positioned over the bottom shield 402 but not over any portion of the first reader stack 404. In some embodiments, this can be accomplished by having the second reader stack 416 in contact with only the surface of the magnetic shielding layer 410 that is positioned over the bottom shield 402 but not over any portion of the first reader stack 404.

The second stack 416 can be deposited over the entire surface of the existing structure, as such the second stack 416 can be adjacent to, disposed on, or in contact with the surface of the magnetic shielding layer 410 positioned over the bottom shield 402, the surface of the second electrical isolation region 412 positioned over the first side surface 407 of the first reader stack 404, the surface of the second electrical isolation region 412 positioned over the second surface 405 of the first reader stack 404, the surface of the second electrical isolation region 412 positioned over the second side surface 409 of the first reader stack 404, or some combination thereof. In some embodiments, the second stack 416 can be adjacent to, disposed on, or in contact with the surface of the magnetic shielding layer 410 positioned over the bottom shield 402, the surface of the second electrical isolation region 412 positioned over the first side surface 407 of the first reader stack 404, the surface of the second electrical isolation region 412 positioned over the second surface 405 of the first reader stack 404, and the surface of the second electrical isolation region 412 positioned over the second side surface 409 of the first reader stack 404.

Figure 3F:
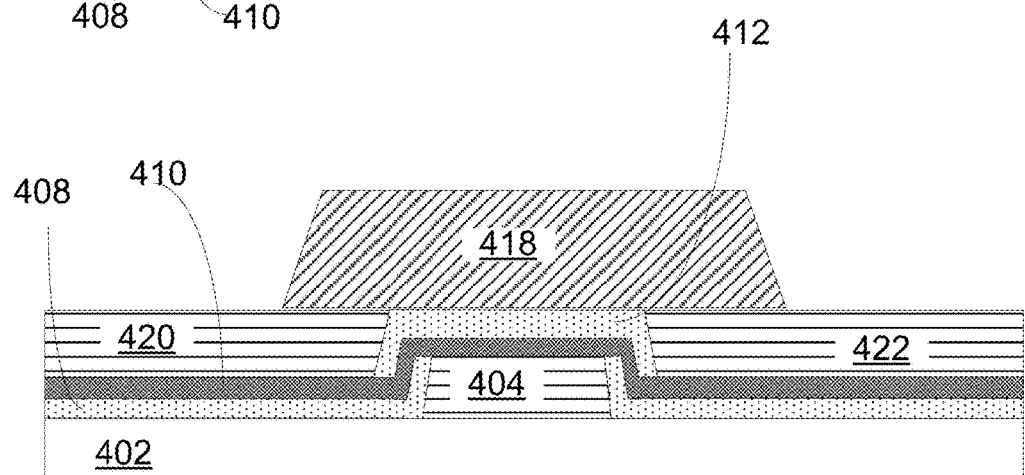

FIG. 3F shows an exemplary article with a third patterned photoresist region 418 being formed thereon. Before formation of the third patterned photoresist region 418, a portion of the second reader stack material 416 could be removed, for example via chemical mechanical polishing (CMP). This would leave the second electrical isolation region 412 as the top surface of the article above the first reader stack 404. This can also be described as forming a second reader region 420 and a third reader region 422. The third patterned photoresist region 418 can be configured to protect the first reader stack 404 and all of the layers over it, a portion of the second reader region 420 adjacent the first side surface 407 of the first reader stack 404 and a portion of the third reader region 422 adjacent the second side surface 409 of the first reader stack 404. Once the third patterned photoresist region 418 is in place, additional portions of the second reader region 420 and the third reader region 422 can be removed.

Figure 3G:
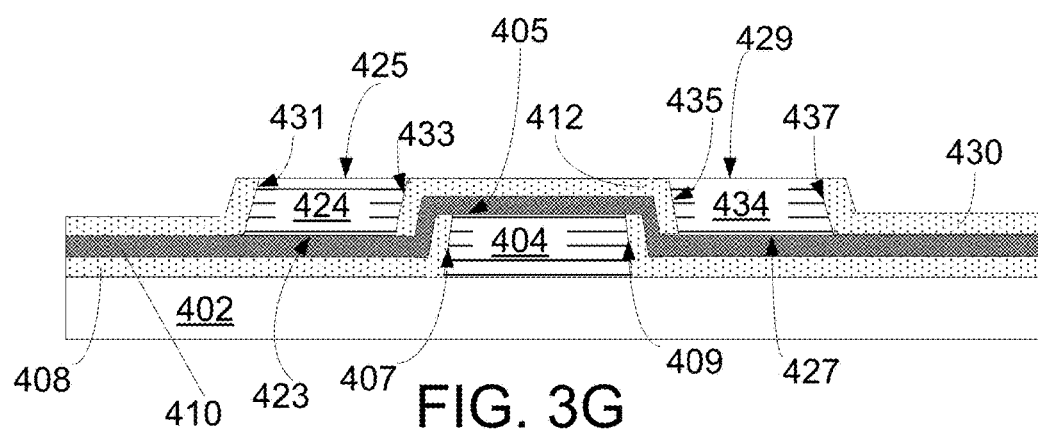

FIG. 3G shows the article after the third patterned photoresist region 418 has been used as a mask to remove portions of the second reader region 420 and the third reader region 422 and the magnetic shielding layer 410. This step can be described as forming a second read element 424 and a third read element 434. The second read element 424 can be described as being adjacent the first side surface 407 of the first reader stack 404 and the third reader stack 434 can be described as being adjacent the second side surface 409 of the first reader stack 404. The second read element 424 can be described as having a first side surface 431 and an opposing second side surface 433. The third read element 434 can be described as having a first side surface 435 and an opposing second side surface 437.

The second read element 424 is adjacent to, or in contact with, the magnetic shielding layer 410 via its first surface 423. The third read element 434 is adjacent to, or in contact with the magnetic shielding layer 410 via its first surface 427. It should be noted that the first surfaces 423 and 427 of the second read element 424 and the third read element 434 could be considered the bottom surfaces of those portions of the device. The first reader stack 404 is adjacent to, or in contact with the magnetic shielding layer 410 via its second surface 405. It should be noted that the second surface 405 of the first reader stack 404 could be considered its top surface. Therefore, the article could further be described in that the magnetic shielding layer is in contact with alternating surfaces (e.g., bottom, top, bottom) of the second read element 424, the first reader stack 404 and the third read element 434.

The third patterned photoresist region 418 can also function as a mask to deposit the material for the third electrical isolation region 430. The third patterned photoresist region 418 can also function to ensure that the material of the second electrical isolation region 412 above the second surface 405 of the first reader stack 404 does not become thicker than desired. It should be noted that the third electrical isolation region 430 can be deposited in one or more than one steps. As such, a region that was deposited in more than one step may still be referred to herein as a single third electrical isolation region 430. The third isolation region 430 can generally be made of materials and have dimensions as discussed above with respect to the third isolation region 324.

The third electrical isolation region 430 is generally located adjacent to, in contact with, or in electrical communication with at least the first side surface 431 of the second read element 424 and the second side surface 437 of the third read element 434. The third electrical isolation region 430 can also be generally located adjacent to, in contact with, or in electrical communication with at least the regions of the magnetic shielding layer 410 that are not in contact with any one of the first reader stack 404, the second read element 424 or the third read element 434. Once the third electrical isolation region 430 has been formed, the third patterned photoresist region 418 can be removed.

Figure 3H:
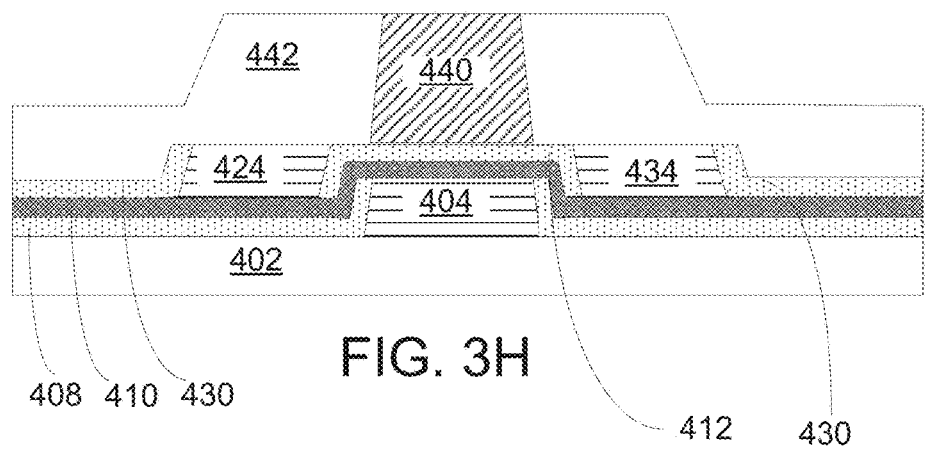

A next step in exemplary methods can include formation of a fourth patterned photoresist region 440 (see FIG. 3H). The fourth patterned photoresist region 440 can be configured in order to form a gap in the top shield (that will be formed in the next step). The gap in the top shield functions to electrically isolate the second read element 424 from the third read element 434. If there were not a gap in the top shield, the two read elements 424 and 434 would be in electrical communication. The fourth patterned photoresist region 440 therefore needs to have a height that is at least as thick as the shield material to be deposited. The fourth patterned photoresist region 440 can be less wide, at the base (e.g., in contact with the second electrical isolation region 412 directly above the first reader stack 404) than the first readers stack 404 at its top. This serves to electrically isolate the second read element 424 and the third read element 434 but affords the largest contact between the top shield and both the second read element 424 and the third read element 434.

In some embodiments, an optional seed layer can be deposited either before or after formation of the fourth patterned photoresist region 440. The seed layer can be beneficial in depositing the material for the top shield. A next exemplary step includes deposition of the material for the top shield. FIG. 3H shows the top shield material 442 deposited on all exposed surfaces (e.g., not on the region protected by the fourth patterned photoresist region 440). The top shield material 442 is in magnetic connection with or is magnetically coupled to the second surface 425 of the second read element 424 and the second surface 429 of the third read element 434. The top shield material 442 can generally be made of materials and have dimensions as discussed above with respect to the top shield 326. The top shield material 442 can also be referred to as forming both a top shield (e.g., in the areas above the article) and a side shield (e.g., in the areas next to the second side surfaces 431 and 437 of the second reader stack 424 and the third reader stack 434) in a final article.

Figure 3I:
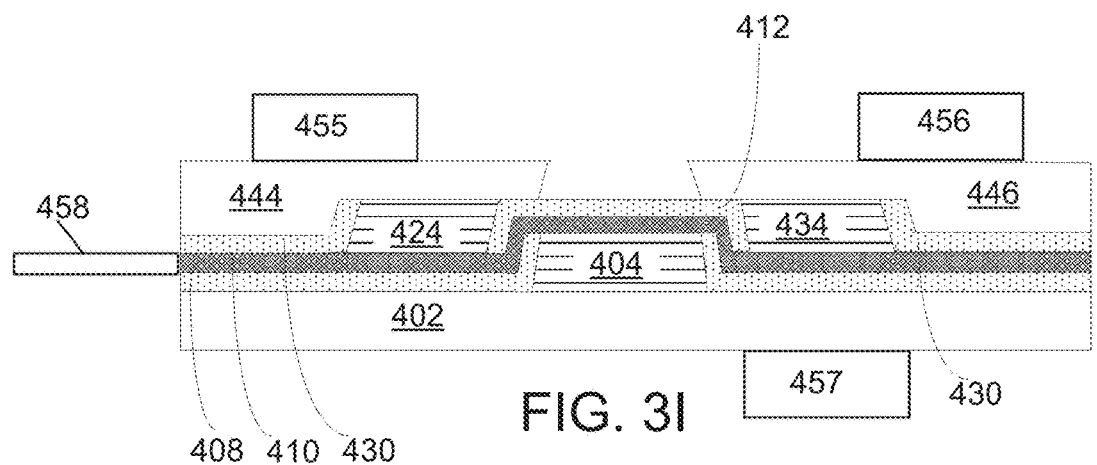

FIG. 3I shows the article after the top shield material 442 has been planarized and the fourth patterned photoresist region 440 has been removed. The final article then can include a first top shield 444 and a second top shield 446. Although not shown in these figures, additional steps can be undertaken to form electrical contacts to the device. In the embodiment depicted in FIG. 3I, a first electrical contact 455 can be formed to the first top shield 444, a second electrical contact 456 can be formed to the second top shield 446, a third electrical contact 457 can be formed to the bottom shield 402 and a fourth electrical contact 458 can be formed to the magnetic shielding layer 410.

Also disclosed herein are devices. Disclosed devices can be utilized for reading data on magnetic recording media. Disclosed devices can include two read elements or more than two read elements (e.g., a plurality of read elements). Devices that include two or more read elements can be utilized with two dimensional magnetic recording (TDMR).

An example of disclosed devices can be seen in FIG. 1 and FIG. 2J. For example, the device disclosed in FIG. 2J includes a bottom shield 302, a top shield 326, a first read element 304, a second read element 316, a magnetic shielding structure 310, a first electrical contact 330 electrically coupled to the bottom shield 302, a second electrical contact electrically coupled to the top shield 326, and a third electrical contact 334 electrically coupled to the magnetic shielding structure 310. The magnetic shielding structure 310 electrically couples the first reader stack 304 to the second reader stack 316.

Figure 4:
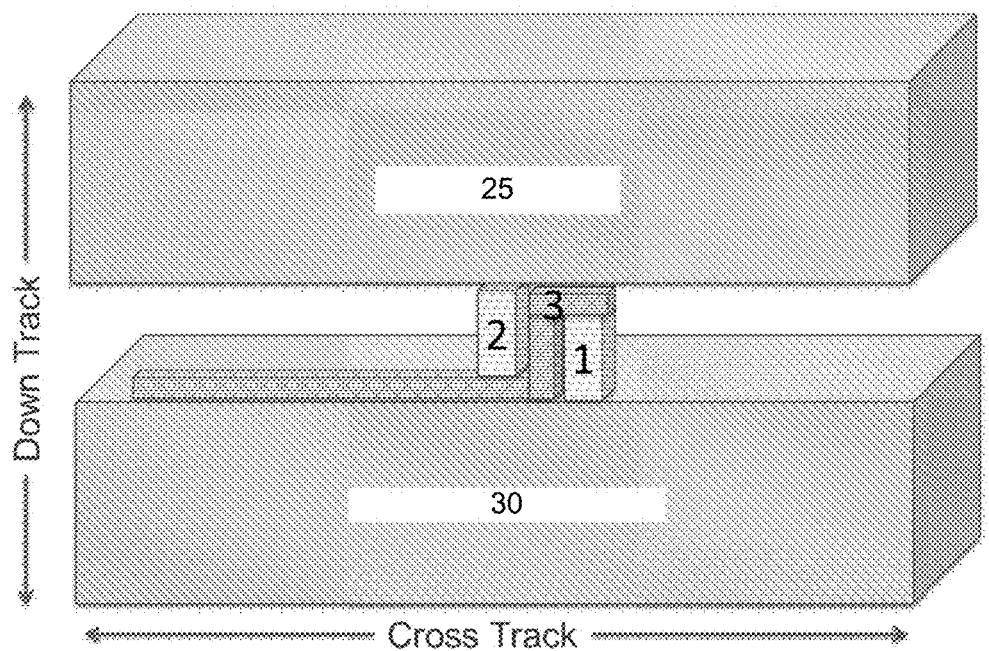
FIG. 4 is a perspective depiction of a disclosed device including two read elements.

A perspective view of portions of a similar device is depicted in FIG. 4. FIG. 4 shows a first read element 1, a second read element 2, and a magnetic shielding structure 3. The figure also indicates a bottom shield 30 and a top shield 25. It should be noted that the bottom shield 30 and the top shield 25 are electrically separated in the disclosed device. The first read element 1 can be adjacent to, in contact with, or magnetically coupled to the bottom shield 30, while the second read element 2 can be adjacent to, in contact with, or magnetically coupled to the top shield 25. The magnetic shielding structure 3 electrically couples the first read element 1 to the second read element 2. As seen therein, the magnetic shielding structure 3 abuts or electrically couples opposing surfaces of the first reader and the second reader stack.

Figure 5:
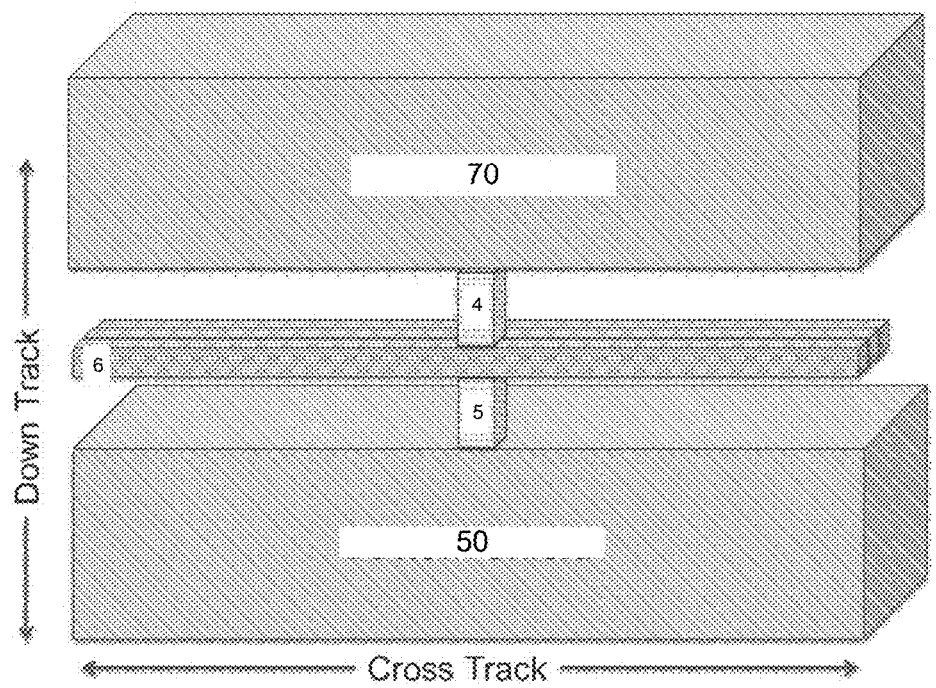
FIG. 5 is a perspective depiction of alternative devices including two read elements.

As seen from FIG. 4, the first read element 1 and the second read element 2 are positioned between the bottom shield 30 and the top shield 25. The first read element 1 and the second read element 2 can also be described as being spaced apart in the cross track direction (indicated by the arrow labeled cross track direction) between the bottom shield 30 and the top shield 25. Alternative TDMR devices include two readers that are spaced apart in the down track direction between the bottom shield and the top shield. An example of such a device is depicted in FIG. 5, where the device includes a bottom shield 50, a top shield 70, a first reader 5, a second reader 4, and a middle magnetic shielding structure 6.

The first read element 1 and the second read element 2 can also be described as being substantially aligned in the downtrack direction (indicated by the arrow labeled downtrack direction). It should also be noted that the downtrack direction and the cross track direction are orthogonal to each other. The phrase substantially aligned, as used herein generally refers to the offset present because of an electrical isolation layer and magnetic shielding layer either underneath a second reader stack or above a first reader stack. The offset could be characterized as being exemplified by the first electrical isolation region 308 and the magnetic shielding layer 310 underneath the second reader stack 316, if the alignment is being considered from the perspective of the bottom shield 302 or the magnetic shielding layer 310 and the second electrical isolation region 312 if the alignment is being considered from the top shield 326. In some embodiments, an offset that could be considered still substantially aligned can be not greater than 30 nm. In some embodiments, an offset that could be considered still substantially aligned can be not greater than 28 nm. In some embodiments, an offset that could be considered still substantially aligned can be not greater than 25 nm. In some embodiments, an offset that could be considered still substantially aligned can be not greater than 22 nm.

In some embodiments, the alignment of the first read element 1 and the second read element 2 could also be described by combining the first reader stack, its overlying electrical isolation region and magnetic shielding layer and comparing that to the position of the second reader stack, its underlying magnetic shielding layer and electrical isolation region. If these combined structures are positioned within fabrication tolerances, the first read element 1 and the second read element 2 can be considered to be substantially aligned. In some embodiments, fabrication tolerances can be considered not greater than 3 nm.

Devices such as those disclosed herein can offer advantages because they only require three electrical contacts. Fewer electrical contacts can decrease processing time and cost, can take up less space (than additional numbers of contacts), and can therefore provide a TDMR that is simpler and less costly to manufacture.

Other exemplary devices include three read elements. Such devices can be described as having the components of a device with only two read elements (such as the device of FIG. 1, FIG. 2J or FIG. 4) along with an additional, third read element, and an additional fourth contact. A magnetic shielding structure, in a device that includes three read elements, functions to electrically couple all three read elements together. The magnetic shielding structure electrically couples opposite surfaces of the three read elements, for example, the bottom, the top, and then the bottom.

Devices disclosed herein can, but need not, have various characteristics as described above in the context of disclosed methods of making them.

In the preceding description, reference is made to the accompanying set of drawings that form a part hereof and in which are shown by way of illustration several specific embodiments. It is to be understood that other embodiments are contemplated and may be made without departing from the scope or spirit of the present disclosure. The above detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the preceding specification and following claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Thus, embodiments of methods of forming devices that include at least two read elements and the devices formed thereby are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

The invention claimed is:

1. A method comprising:
    forming a first read element, the first read element having a first surface which is magnetically coupled to a bottom shield, a second surface which is opposite the first surface, a first side surface between the first and second surfaces and an opposite second side surface between the first and second surfaces of the first read element;
    electrically isolating the first side surface and the second side surface of the first read element;
    forming a shielding structure on at least the second surface of the first read element;
    forming a second read element, the second read element having a first surface which is electrically coupled to a portion of the shielding structure, a second surface of the second read element which is opposite the first surface of the second read element, a first side surface of the second read element between the first and second surfaces of the second read element and an opposite second side surface between the first and second surfaces of the second read element the second side surface of the second read element being adjacent the first side surface of the first read element but not electrically and magnetically coupled thereto;
    forming a third read element, the third read element having a first surface which is electrically coupled to a portion of the shielding structure, a second surface which is opposite the first surface of the third read element, a first side surface between the first and second surfaces of the third read element and an opposite second side surface of the third read element between the first and second surfaces of the third read element, the first side surface of the third read element being adjacent the second side surface of the first read element but not electrically and magnetically coupled thereto;
    electrically isolating the entire second read element except the first and the second surface of the second read element;
    electrically isolating the entire third read element except the first and the second surface of the third read element; and
    forming a first and second top shield, the first top shield being magnetically coupled to the second surface of the second read element and the second top shield being magnetically coupled to the second surface of the third read element.

2. The method according to claim 1 further comprising forming a first electrical contact to the first top shield and forming a second electrical contact to the second top shield.

3. The method according to claim 1 further comprising forming a third electrical contact to the bottom shield.

4. The method according to claim 3, wherein the third electrical contact was formed before the first read element is formed.

5. The method according to claim 1 further comprising forming a fourth electrical contact to the shielding structure.

6. A method comprising:
    forming a first reader stack on a bottom shield, the first reader stack having a first surface which is magnetically coupled to the bottom shield, a second surface which is opposite the first surface, and a first side surface between the first and second surfaces and a second side surface between the first and second surfaces and opposite the first side surface;
    electrically isolating only the first side surface and the second side surfaces of the first reader stack;
    forming a magnetic shielding layer on the second surface of the first reader stack;
    forming a second electrical isolation region that functions to electrically isolate the magnetic shielding layer on the second surface of the first reader stack;
    forming a second reader stack and a third reader stack adjacent to but not over the second isolation region, the second reader stack having a first surface in contact with the magnetic shielding layer, an opposite second surface, a first side surface and an opposing second side surface, the second side surface of the second reader stack in contact with the second isolation region adjacent the first side surface of the first reader stack, and the third reader stack having a first surface in contact with the magnetic shielding layer, an opposite second surface, a first side surface and an opposing second side surface, the first side surface of the third reader stack in contact with the second isolation region adjacent the first side surface of the first reader stack; and
    electrically isolating portions of the second reader stack and the third reader stack so that only the second surfaces thereof are exposed.

7. The method according to claim 6 further comprising forming a first and second top shield, the first top shield being magnetically coupled to the second surface of the second reader stack and the second top shield being magnetically coupled to the second surface of the third reader stack.

8. The method according to claim 7 further comprising forming a first electrical contact to the first top shield, forming a second electrical contact to the second top shield and forming a fourth electrical contact to the magnetic shielding layer.

9. The method according to claim 8 further comprising forming a third electrical contact to the bottom shield.

* * * * *

UNITED STATES PATENT AND TRADEMARK OFFICE
CERTIFICATE OF CORRECTION

PATENT NO. : 10,102,870 B2  
APPLICATION NO. : 15/383351  
DATED : October 16, 2018  
INVENTOR(S) : Steven A. Mastain Page 1 of 1

It is certified that error appears in the above-identified patent and that said Letters Patent is hereby corrected as shown below:

In the Claims

Column 15, Line 56: In Claim 1, add a "," between "the second read element" and "the second side".

Signed and Sealed this  
Fourth Day of June, 2019

Andrei Iancu  
*Director of the United States Patent and Trademark Office*